United States Patent [19]
Egli

[11] 4,033,370
[45] July 5, 1977

[54] MIXING VALVE FOR CONTROLLING PRESSURE AND TEMPERATURE OF A LIQUID

[75] Inventor: Werner Egli, Eglisau, Switzerland

[73] Assignee: Armaturenfabrik Wallisellen AG., Wallisellen, Switzerland

[22] Filed: Oct. 15, 1975

[21] Appl. No.: 622,785

[30] Foreign Application Priority Data

Oct. 15, 1974 Switzerland .................. 13832/74

[52] U.S. Cl. .................. 137/100; 137/625.17
[51] Int. Cl.² .................................. F16K 11/02
[58] Field of Search .......... 137/98, 100, 625.17; 251/229, 248

[56] References Cited
UNITED STATES PATENTS

| | | |
|---|---|---|
| 2,025,244 | 12/1935 | Morehead et al. ............ 251/248 X |
| 2,308,127 | 1/1943 | Symmons ....................... 137/100 X |
| 3,099,996 | 8/1963 | Symmons ....................... 137/100 X |
| 3,105,519 | 10/1963 | Fraser ............................ 137/625.17 |
| 3,448,755 | 6/1969 | Symmons .......................... 137/100 |
| 3,884,259 | 5/1975 | Hosmer et al. ................. 251/248 X |

*Primary Examiner*—William R. Cline
*Attorney, Agent, or Firm*—Sughrue, Rothwell, Mion, Zinn and Macpeak

[57] ABSTRACT

There is disclosed a mixing valve for control of water temperature and pressure from two distinct hot and cold water sources. A pressure equalizing cartridge utilizes radial discharge openings and by axial movement of this cartridge, control of temperature is achieved. By rotary movement of the cartridge, discharge ports in a liner pipe which surrounds the equalizing cartridge are blocked to control the quantity of water discharged.

7 Claims, 4 Drawing Figures

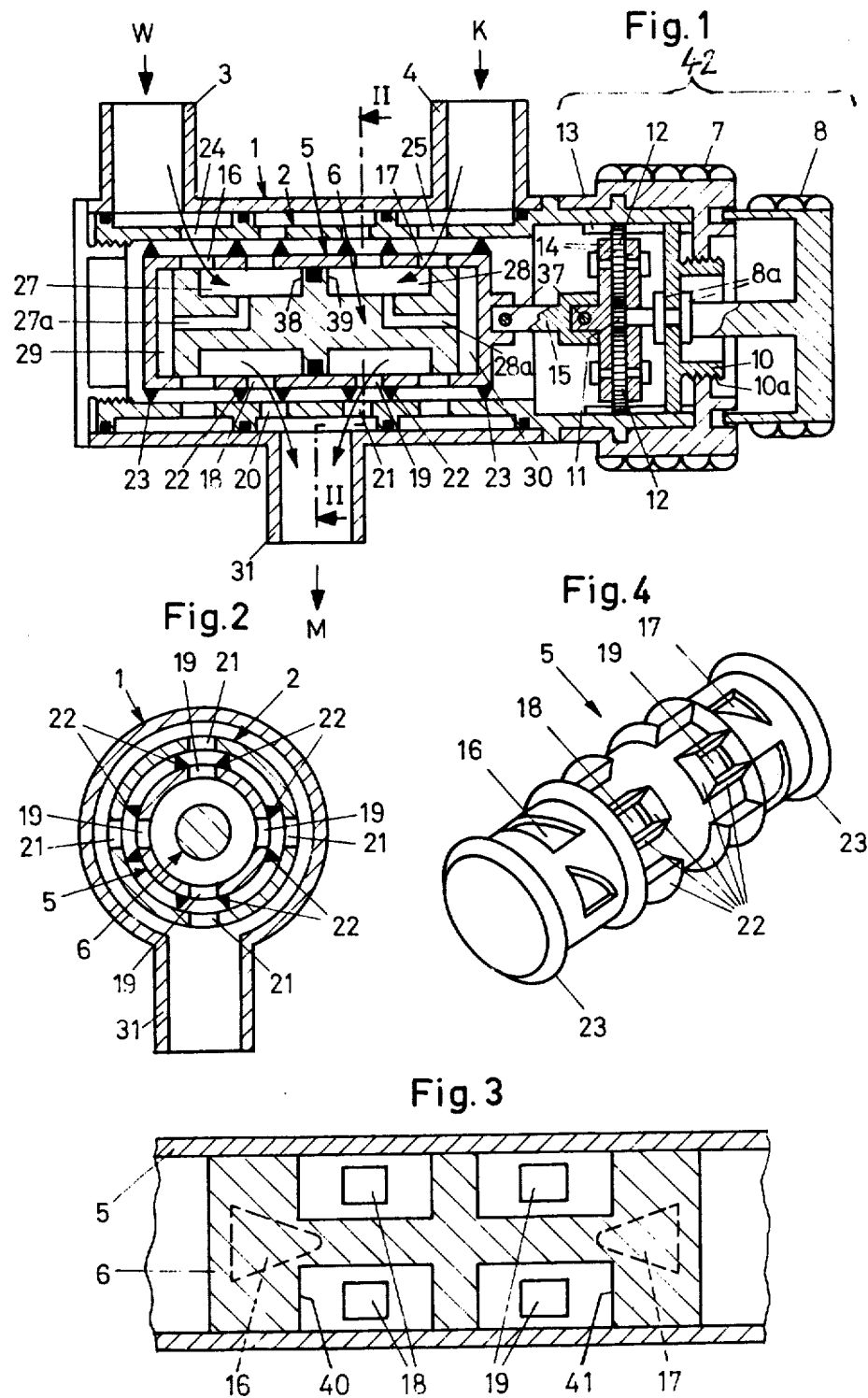

MIXING VALVE FOR CONTROLLING PRESSURE AND TEMPERATURE OF A LIQUID

BACKGROUND OF THE INVENTION

1. Field of the Invention

The present invention relates to a mixing valve for mixing two liquids having different temperatures and pressures, more particularly for mixing cold and hot water, comprising variable openings of passage for controlling the temperature and quantity of liquid and a pressure equalizing cartridge.

2. Description of the Prior Art

Mixing valves of this type are already known. In the case of these known mixing valves comprising pressure equalizing cartridges the mixing ratio and the quantity of liquid are either controlled independently of one another or combined valves are provided which have an adjustable valve seat. Accordingly, the structure of these mixing valves is extremely complicated and they are costly to produce.

SUMMARY OF THE INVENTION

The object of the present invention is to produce a mixing valve of the type described initially which has a considerably simpler structure in that the discharge openings of the pressure equalizing unit can be used to simultaneously control the temperature and the quantity of liquid, and wherein the pressure equalizing unit comprising all the parts which are subject to wear, can be in the form of an inexpensive disposable cartridge.

This problem is solved according to the invention in that the cylindrical housing of the pressure equalizing cartridge comprises radial discharge openings which form part of a combined control means for controlling the temperature and quantity of the liquid and which are also used to completely block the two discharge openings in parts of the liner pipe and are in operative connection with the latter.

Other objects, features and advantages of the present invention will be made apparent in the following detailed description of a preferred embodiment of the mixing valve according to the invention provided with reference to the accompanying drawings.

BRIEF DESCRIPTION OF THE DRAWINGS

FIG. 1 is a diagrammatic longitudinal sectional view through a mixing valve.

FIG. 2 is a cross-section along the line II—II in FIG. 1.

FIG. 3 is a diagrammatic longitudinal sectional view through a part of a pressure equalizing unit comprising the various control openings and FIG. 4 is a perspective view of a practical embodiment of a pressure equalizing cartridge.

DESCRIPTION OF THE PREFERRED EMBODIMENT

The mixing valve represented in FIGS. 1 and 2 comprises a housing 1 comprising two inlet nozzles 3,4 for the admission of hot water H and cold water C. It also comprises an outlet 31 for discharging the mixed water M. The housing 1 contains a liner pipe 2 comprising the openings 20,21 and 24 and 25. A cylindrical pressure equalizing cartridge 5 comprising within the same an axially displaceable pressure equalizing piston 6 is disposed within the liner pipe 2. The surface of the cartridge 5 comprises continuous openings 16,17 and 18 and 19. The openings 18 and 19 are surrounded by a molded rubber element comprising sealing ribs 22 which are in sealing contact with the inner side of the liner pipe 2. Soft molded rubber sealing ribs 23 are provided at both ends of the cartridge 5 and between the openings 16 and 18 or 17 and 19. These molded rubber sealing ribs 23 extend over the entire periphery of the cartridge and prevent water from being discharged into the chambers on both sides of the front sides of the cartridge 5 and into the openings 20 and 21 when the valve is closed. The pressure equalizing piston contains conventional annular chambers 27 or 28 for hot and cold water which communicate with the chambers 29 and 30 on the front side of the piston 6 via the conduits 27a or 28a.

The pressure equalizing cartridge 5 is connected via an intermediate part 15 with the wheel mounting means 14 of a planetary gear comprising the wheels 11, 12 and an inner toothing 13 of the liner pipe 2. An insert sleeve 10 comprising an outer thread 10a also engages in the inner toothing 13. A regulating handle 7 which controls the mixing temperature and which is mounted on the liner pipe 2 in a rotatable but axially immovable manner engages in the outer thread 10a. A second regulating handle is rigidly connected to the gear wheel 11. The intermediate part 15 is connected to the cartridge 5 and the wheel mounting means 14 in a non-rotatable and axially immovable manner by means of the pins 37. The insert sleeve 10 engages in a rotatable but axially immovable manner between two flanges 8a of the control handle 8. The intermediate part 15, in the form represented, has the advantage that the same pressure equalizing cartridge can be used for various control mechanisms and types of mixing valves without having to be altered.

The mode of operation of the mixing valve as represented in FIGS. 1 and 2 is as follows: In the position of the cartridge 5 represented in FIG. 1, the hot water H flows through the openings 24 and 16 into the chambers 27 and 29 and cold water flows through the openings 25 and 17 into the chambers 28 and 30. Hot water simultaneously flows through the openings 18 and 20 and cold water through the openings 19 and 21 into the discharge nozzles 31 where mixed water having a specific average temperature is obtained.

The handle 7 is turned to change the temperature of the mixed water M. Rotation of the handle 7 results in axial displacement of the cartridge 5 with respect to the insert pipe 2. When, for example, the cartridge 5 is turned to the right in FIG. 1, the effective flow pasage cross-section of the openings 20 is increased and that of the openings 21 is reduced. As a result, the temperature of the mixed water M is raised and, conversely, when the cartridge 5 is moved to the left, the temperature is lowered. In the two end positions of the cartridge 5 only completely cold or completely hot water flows from the discharge nozzles 31.

The handle 8 is turned to control the quantity of mixed water flowing from the nozzles. When the handle 8 is turned, the cartridge 5 is also rotated about a smaller angle of rotation by means of the intermediate gear 11, 12, 13. FIG. 2 is a cross-sectional view through the mixing valve in the region of the cooperating openings 19 of the cartridge and 21 of the liner pipe 2. In the position represented, the mixing valve is in a fully open position in which the openings 19 and 21 are coaxially oriented. When the cartridge 5 is rotated, the ribs 22 increasingly cover the openings 21, thereby throttling the flow of cold and hot water and finally totally interrupting the same. FIG. 3 shows a part of the pressure equalizing cartridge 5 comprising the control openings. While the discharge openings 18 and 19 are used to control pressure and quantity, pressure equalization is effected by means of the two inlet openings 16 and 17. The latter are covered to a greater or lesser extent by the edges 40 and 41 depending on the position of the piston 6. These inlet openings 16 and 17 are designed in such a way that the axial movements of the edges 40 and 41 in the opening direction result in an over-proportional increase in the inlet cross-section. This feature facilitates mixing of hot and cold water at differing pressures and during sudden changes of condition, for example, when the temperature is suddenly adjusted. The mode of operation of the piston 6 is conventional. As soon as a pressure difference prevails at the two front sides 38, 39, or in the chambers 29 or 30, it is axially displaced until equal pressure is again obtained. When the piston 6 is axially displaced, the cross-sections of the afore-mentioned openings 16 or 17 are varied in such a way that a temperature variation in the mixing water caused by pressure differences in the inflow lines, is compensated.

The above-described pressure equalizing system which employs a piston could also be replaced by a pressure equalizing system employing membranes in the pressure equalizing cartridge.

The embodiment of the mixing valve which has been described obviously only constitutes one of various embodiments. Both the axial displacement and rotation of the pressure equalizing cartridge could be produced in other ways. Other sealing means apart from the molded rubber elements comprising sealing ribs 22, 23 could also be used.

What is claimed is:

1. In a mixing valve for mixing two input liquids having different temperatures and pressures, more particularly for mixing cold and hot water having variable openings of passage for controlling both the temperature and quantity of liquid output using a pressure equalizing cartridge, the improvement comprising: said cartridge having a cylindrical housing, a liner member disposed about said cartridge; a plurality of radial discharge openings on said housing, a piston within said cartridge and axially movable in response to pressure variations; a combined control means for controlling liquid temperatures and quantities, said openings forming a part of said control means; said liner having two series of discharge ports and said control means operable to completely block each of the two series of discharge ports in sections of the liner pipe said discharge ports disposed in operative variable connection with the discharge openings; said cartridge disposed for both rotatory and axial movement relative to the liner to vary the operative connection of said discharge ports and discharge openings; said relative axial movement of the pressure equalizing cartridge with a corresponding section of the liner pipe varying the proportions of the input liquids to control the temperature, and said relative rotary movement of the pressure equalizing cartridge with the sections of the liner pipe blocking said discharge ports to control quantity.

2. A mixing valve as claimed in claim 1, characterized in that said pressure equalizing cartridge has disposed on its outer surface, packing elements, said elements being subject to wear and are replaced when the cartridge is exchanged.

3. A mixing valve as claimed in claim 2, including a plurality of control openings in said cartridge, said control openings useable to produce pressure equalization by means of axial movements of the movable piston in the pressure equalizing cartridge, said control openings having a cross-section which increases for both liquid inputs through the parallel displacement of a regulating edge of the piston in proportion to the opening axial control path; said inlet openings being disposed on the periphery of the cylindrical housing of the pressure equalizing cartridge.

4. A mixing valve as claimed in claim 1, characterized in that said pressure equalizing cartridge is connected to said control means by an interchangeable intermediate element.

5. A mixing valve as claimed in claim 1, characterized in that soft sealing members are disposed in an annular chamber between the pressure equalizing cartridge and the sections of the liner pipe.

6. A mixing valve as claimed in claim 1, including inner and outer regulating handles for controlling the temperature and quantity of the liquid, the rotary movement of said cartridge being transmitted by the outer handle to the pressure equalizing cartridge to be rotated.

7. A mixing valve as claimed in claim 6, characterized in that a gear means, comprising a toothed wheel gear is provided between the outer regulating handle and the cartridge to be rotated.

* * * * *